United States Patent
Genske et al.

(10) Patent No.: US 6,846,551 B2
(45) Date of Patent: Jan. 25, 2005

(54) MULTILAYER FILM STRUCTURES HAVING IMPROVED SEAL AND TEAR PROPERTIES

(75) Inventors: Roger P. Genske, Neenah, WI (US); Russell P. Gehrke, Menasha, WI (US); Erin M. Duffy, Appleton, WI (US)

(73) Assignee: Pechiney Emballage Flexible Europe (FR)

(*) Notice: Subject to any disclaimer, the term of this patent is extended or adjusted under 35 U.S.C. 154(b) by 0 days.

(21) Appl. No.: 09/470,386

(22) Filed: Dec. 22, 1999

(65) Prior Publication Data

US 2002/0086174 A1 Jul. 4, 2002

(51) Int. Cl.⁷ .......................... B32B 7/02; B32B 27/08
(52) U.S. Cl. .................. 428/216; 428/213; 428/215; 428/476.1; 428/483; 428/500; 428/515; 428/516; 428/910
(58) Field of Search .................. 428/213, 215, 428/216, 476.1, 483, 910, 500, 515, 516, 517

(56) References Cited

U.S. PATENT DOCUMENTS

| | | | |
|---|---|---|---|
| 3,790,744 A | 2/1974 | Bowen | 219/121.69 |
| 4,221,882 A | 9/1980 | Huff | 525/240 |
| 4,598,826 A | 7/1986 | Shinbach | 206/620 |
| 4,778,697 A | 10/1988 | Genske et al. | 428/35 |
| 4,892,911 A | 1/1990 | Genske | 525/240 |
| 5,272,236 A | 12/1993 | Lai et al. | 526/348.5 |
| 5,346,764 A * | 9/1994 | Kudo et al. | 428/349 |
| 5,376,439 A | 12/1994 | Hodgson et al. | 428/220 |
| 5,558,930 A | 9/1996 | DiPoto | 428/216 |
| 5,562,958 A | 10/1996 | Walton et al. | 428/34.9 |
| 5,591,390 A | 1/1997 | Walton et al. | 264/456 |
| 5,595,705 A | 1/1997 | Walton et al. | 264/456 |
| 5,614,297 A | 3/1997 | Velazquez | 428/218 |
| 5,725,962 A * | 3/1998 | Bader et al. | 428/515 |
| 5,755,081 A | 5/1998 | Rivett et al. | 53/477 |
| 5,817,386 A | 10/1998 | Adamko et al. | 428/41.3 |
| 5,844,026 A | 12/1998 | Galbo et al. | 524/100 |
| 5,911,665 A | 6/1999 | Heydarpour et al. | 53/449 |
| 5,948,517 A | 9/1999 | Adamko et al. | 428/219 |

\* cited by examiner

*Primary Examiner*—Monique R. Jackson
(74) *Attorney, Agent, or Firm*—McDermott Will & Emery LLP

(57) ABSTRACT

A multilayer film structure having at least two layers wherein the first layer comprises poly(ethylene) having a density range from about 0.93 g/cc to 0.97 g/cc; and a second layer comprising poly(ethylene) having a density range from 0.89 g/cc to 0.93 g/cc wherein the second layer is capable of forming a heat seal. The multilayer film structure is capable of being laminated to another film structure or a packaging film component. The packages of the present invention are useful for the packaging of flowable materials.

21 Claims, 3 Drawing Sheets

Three Layer Film Structure

Package is grasped with two hands; one hand tears the corner of the package in a downward/horizontal motion to create a small opening through which product is dispensed. Any corner on the package can be torn away.

Three Layer Film Structure

MULTILAYER FILM STRUCTURES HAVING IMPROVED SEAL AND TEAR PROPERTIES

BACKGROUND OF THE INVENTION

The present invention relates to multilayer film structures having improved seal and tear properties. Specifically, the film structures of the present invention can be used alone or laminated to another film or a packaging film component thus forming a package, which contains a product. The film structures of the present invention are particularly useful for packaging of flowable materials including but not limited to condiment packaging.

Packages for enclosing products are usually made by forming a polymeric film into a shape to accommodate the product, placing another polymeric film over the product and then heat sealing the film together to maintain the product within the two film structures. Packages for products may also be made by forming a polymeric film into a pouch, heat sealing closed all but one of the open edges, filling the pouch with a product, and then heat sealing closed the one open edge. Both of these generally described processes for making packages are known in the art. The packages made from the above-described processes can have problems in their heat sealing properties and if the package is intended to be opened by a consumer, in their tear properties. These problems are especially acute if the package, which contains a flowable material, is intended to be opened by a consumer wherein a combination of good seal and good tear properties are necessary.

In forming heat seals in packages, especially packages for flowable materials, two films (i.e., a film and another film or two portions of the same film) are brought together, and then sufficient heat and pressure are applied to fuse or seal the films together. Colorants are added to packaging film structures to provide a more aesthetically pleasing package or to provide a background for printed material. If the film is a multilayer film, then the colorant is blended with one or more layers of the film, and specifically the colorant is blended with a polymeric material which comprises a layer or layers of the film structures.

Packages, especially packages for the containment of flowable materials, need good seal properties and good tear properties. Good seal properties are necessary to insure that the flowable material does not leak from the package. Good tear properties are necessary to insure that the package can be opened easily by the consumer without tearing through the entire package causing spillage of the flowable material.

U.S. Pat. No. 5,879,768 and U.S. Pat. No. 5,360,648 both to Falla, et al. disclose pouches for packaging flowable materials. In particular, a pouch made from a monolayer or multilayer film structure such as a two-layer or a three-layer coextruded film is disclosed. The film structure contains at least one layer of a blend of a substantially linear ethylene polymer or a homogeneously branched ethylene polymer and a high pressure low density polyethylene as a seal layer. In addition, the film structure contains a pigment to render the film structure opaque.

U.S. Pat. No. 5,360,648 to Rivett et al. discloses a heat-sealable, multilayer film containing a colorant and method for making a package with such film. In particular, the multilayer film includes:

a. a first layer comprising a material having a melting point of at least 145° C.;

b. a second layer comprising a colorant blended with a polymer having a vicat softening point ranging from 100° C. to 140° C.;

c. a third layer comprising a material having a melting point of at least 135° C.; and d. a fourth layer comprising a material which is capable of forming a heat-seal, wherein the second layer is positioned between the first and third layers and the fourth layer is an exterior layer.

The art has not provided packages for flowable materials having the unique combination of both good seal and good tear properties. The prior art packages appear to be lacking in that packages with good seal properties have not had good tear properties, and packages with good tear properties have not had good seal properties. Accordingly, there is a need in the art of flowable material packaging for a package which has good seal and good tear properties, can be produced in a cost-efficient manner and is easy to process.

SUMMARY OF THE INVENTION

The present invention provides a multilayer film structure having at least two layers comprising:

(a) A first layer comprising poly(ethylene) or blended poly(ethylene) wherein said poly(ethylene) is selected from poly(ethylenes) having a density from about 0.93 g/cc to about 0.97 g/cc; and (b) A second layer comprising a poly(ethylene) or a blended poly(ethylene) wherein said second layer poly (ethylene) has a density range from about 0.89 g/cc to about 0.93 g/cc and wherein said second layer is capable of forming a heat seal.

The first layer may optionally comprise colorants and/or fillers. Also, the first layer may optionally comprise two layers in the film structure, each of the two layers comprising at least one identical poly(ethylene) or blended poly (ethylene), with either or both of the two layers comprising any of the following: colorants, fillers, and regrind of the entire multilayer film.

The invention also provides a package and a method for making a package comprising the steps of providing a multilayer film structure as described above or laminating said multilayer film structure to another film structure or a packaging film component to form a complete package for the containment of a product such as flowable materials. The film structures of the present invention are particularly useful as packages for flowable and dispensable materials. Flowable materials include, but are not limited to, food products such as honey, mustard, ketchup, mayonnaise, salad dressings, and sauces; and personal use products such as shampoo, hair conditioners and lotions.

Definitions

Figure 1:
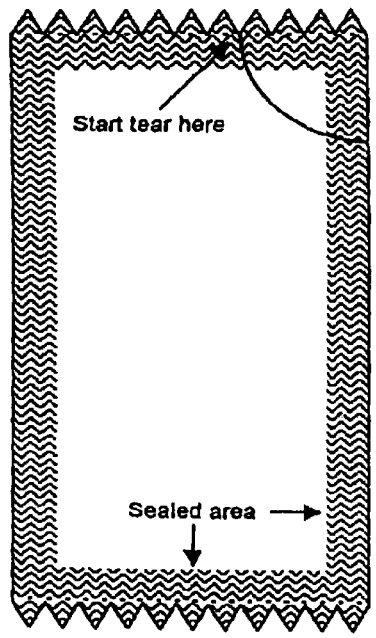
FIG. 1 is a package for flowable materials made according to the present invention.

"Blended poly(ethylene)" refers to the combination of two or more poly(ethylenes).

"Coextrusion" or "coextrude," and the like refer to the process of extruding two or more materials combined in a single die so that the extrudate merges welded together into a laminar structure before chilling, i.e., quenching. Coextrusion can be employed in film blowing, free film extrusions, and extrusion coating processes.

"Density" refers to the weight to matter per unit volume of a substance as determined by ASTM D-2839, D-1505.

"Fillers" refers to inorganic particles such as talc and calcium carbonate.

"Heat-seal" refers to the union of two films by bringing the films into contact, or at least close proximity, with one another and then applying sufficient heat and pressure to a predetermined area (or areas) of the films to cause the contacting surfaces of the films in the predetermined area to become molten and intermix with one another, thereby forming an essentially inseparable bond between the two films in the predetermined area when the heat and pressure are removed therefrom and the area is allowed to cool.

"Layer" refers to a discrete film component, which is coextensive with the film and has a substantially uniform composition.

"Multilayer film" means a thermoplastic material generally in sheet or web form having one or more layers formed from polymeric materials which are bonded together by any conventional means known in the art (i.e., coextrusion, extrusion coating, and lamination, vapor deposition coating, solvent coating, emulsion coating, or suspension coating.

"Poly(ethylenes)" refers to a family of resins obtained by polymerizing the gas ethylene, $C_2H_4$ By varying the catalysts and methods of polymerization, properties such as density, melt index, crystallinity, degree of branching and crosslinking, molecular weight and molecular weight distribution can be regulated over wide ranges. Further modifications are obtained by copolymerization, chlorination and compounding additives. This includes resins such as the ethylene alpha-olefin copolymers which designate copolymers of ethylene with one or more comonomers selected from $C_3$ to $C_{20}$ alpha-olefins such as 1-butene, 1-pentene, 1-hexene, 1-octene, methyl pentene and the like; the term "poly(ethylene)" is also meant to include homogeneous polymers such as metallocene catalyzed linear homogeneous ethylene/alpha olefin copolymers. The homogeneous polymers can also be prepared using other single-site type catalysts.

"Polymer" or "polymeric" means the product of polymerization and includes but is not limited to homopolymers, monopolymers, copolymers, interpolymers, terpolymers, block copolymers, graft copolymers, and addition copolymers.

"Processing aid" means a substance or material incorporated in a film or film layer to increase the flexibility, workability, or extrudability of the film. These substances include both monomeric plasticizers and polymeric plasticizers and are generally those materials, which function by reducing the normal intermolecular forces in a resin thus permitting the macromolecules to slide over one another more freely. The art refers to many plasticizers as stabilizers. Thus, the terms, "plasticizer" and "stabilizer" are intended to be used interchangeably herein.

"Regrind" refers to the "spent" or discarded portions of a film structure, which are reused to make up a portion of the film layers or structure.

"Tear" refers to fracturing of film in a controlled manner to open a package by the application of digital force.

DETAILED DESCRIPTION OF THE INVENTION

FIG. 1 shows a complete package for flowable materials made according to the present invention.

Figure 2:
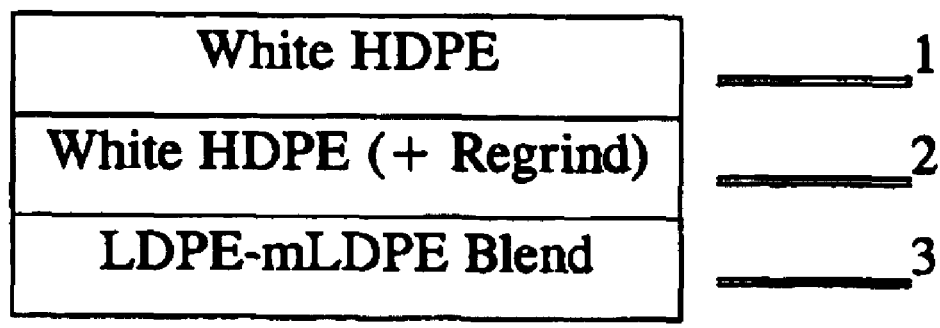
FIG. 2 is a film structure according to the present invention having a three layer film structure.

FIG. 2 shows a three-layer film structure according to the invention wherein the third layer of said film structure is capable of forming a heat seal.

First layer (1) comprises poly(ethylene) or blended poly(ethylene) wherein the poly(ethylene) has a density range from about 0.93 g/cc to about 0.97 g/cc. Poly(ethylenes) having this density range are exemplified by medium density poly(ethylene) (MDPE) and high-density poly(ethylene) (HDPE). A preferred density range for the poly(ethylene) of said layer is from about 0.94 g/cc to about 0.965 g/cc. Poly(ethylenes) having this density range are exemplified by HDPE. A particularly preferred poly(ethylene) for said first layer is high density poly(ethylene) (HDPE) having a density of about 0.96 g/cc. HDPE can further be exemplified by Equistar Alathon® M-6060 HDPE.

The first layer may optionally contain a colorant. Colorants suitable for practice in this invention can be exemplified by Ampacet Corp. KM82199 colorant. The first layer may also optionally contain processing aids and/or fillers. In a preferred embodiment of the present invention the poly(ethylene) in the first layer comprises about 80% to about 100% of the total layer. If a colorant is present, the colorant comprises from about 0% to about 20% of the total layer. Unless otherwise specified, percentages as used herein are by weight.

Second layer (2) which is a duplicate of the first layer (1) comprises poly(ethylene or blended poly(ethylene) wherein the poly(ethylene) has a density range from about 0.93 g/cc to about 0.97 g/cc. Poly(ethylenes) having this density range are exemplified by medium density poly(ethylene) (MDPE) and high-density poly(ethylene) (HDPE). A preferred density range for the poly(ethylene) of said layer is from about 0.94 g/cc to about 0.965 g/cc. Poly(ethylenes) having this density range are exemplified by HDPE A particularly preferred poly(ethylene) for said second layer is high density poly(ethylene) (HDPE) having a density of about 0.96 g/cc. HDPE can further be exemplified by Equistar M-6060.

The second layer may optionally contain a colorant. Colorants suitable for practice in this invention can be exemplified by Ampacet Corp. KM82199 colorant. The second layer can also optionally contain processing aids and/or fillers. In a preferred embodiment of the present invention the poly(ethylene) in the second layer comprises about 70% to about 100% of the total layer. If a colorant is present, the colorant comprises from about 0% to about 30% of the total layer.

Layers 1 and/or 2 may optionally contain from about 0% to about 40% of regrind.

Third layer (3) comprises poly(ethylenes) or blended (poly(ethylenes) wherein the poly(ethylene) has a density range from about 0.89 g/cc to about 0.93 g/cc. Poly(ethylenes) having this density range are exemplified by low density poly(ethylene) (LDPE), linear low density poly(ethylene) (LLDPE), very low density poly(ethylene) (VLDPE) and metallocene catalyzed homogeneous low density polyethylene) (mLDPE) and plastomers. A preferred density range for the poly(ethylenes) of said third layer are about 0.90 g/cc to about 0.925 g/cc. Poly(ethylenes) having this density range are exemplified by LDPE, LLDPE, VLDPE, mLDPE and plastomers. A particularly preferred poly(ethylene) blend for said third layer is a blend of plastomer having a density of about 0.911 g/cc and LDPE having a density of about 0.921 g/cc. A preferred plastomer can further be exemplified by Dow PT1409. A preferred LDPE can be further exemplified by Exxon LD-135.09.

Suitable colorants include pigments and dyes, especially those which are incorporated in a color concentrate, i.e. a compounded blend of a resin and generally a high percentage of either pigment or dye. The color concentrate is diluted during coextrusion by mixing the concentrate with the primary resin (i.e., one of the polymers listed above as suitable for the first or/and second layers). Preferably the resin portion of the color concentrate is compatible with the polymeric material selected for use in the first and/or second layers.

Layers 1, 2 and 3 of the three-layer film structure may have individual thicknesses ranging from about 0.07 mils to about 2.50 mils. The first layer may have a thickness ranging from about 0.07 mils to about 0.70 mils. The second layer may have a thickness ranging from about 0.60 mils to about 2.50 mils. The third layer may have a thickness ranging from about 0.45 mils to about 1.75 mils. The thickness for the entire three-layer film structure may range from about 1.0 mil to about 5.0 mils.

Preferably, the polymeric material, which comprises the first layer of the film structure of FIG. 2, is no greater than about 20% of the total thickness of the film structure. The polymeric material, which comprises the second layer of the film structure of FIG. 2, is no greater than about 70% of the total thickness of the film structure. The polymeric material, which comprises the third layer of the film structure, is no greater than about 50% of the total thickness of the film structure. Most preferably, the first layer of the film structure is about 10% of the film structure, the second layer is about 60%, and the third layer is about 30% of the total thickness of the structure.

Various additives may be used in any or all layers of the multilayer film structures. These additives are collectively known as processing aids and fillers.

Additional layers can be added to the multilayer film structures of the invention as desired. For example, in another embodiment of the invention, tie or adhesive layers may be added to the film structures of the invention in order to bond or laminate said film structures to another film structure. An ink layer or printing may also be added to the film structures of the invention such as by surface or stamp printing.

Polymeric materials suitable for use in film structures which may be laminated to the film structures of the invention are exemplified by oriented poly (ethylene terephthalate) (PET), oriented poly (propylene) (PP) oriented nylon, which can be exemplified by Nylon 6, and coated or uncoated cellophanes. The oriented PET, oriented PP, and oriented nylon may also have a barrier coating wherein the barrier component may be SIOX, PVdC or a metallized coating.

Figure 3:
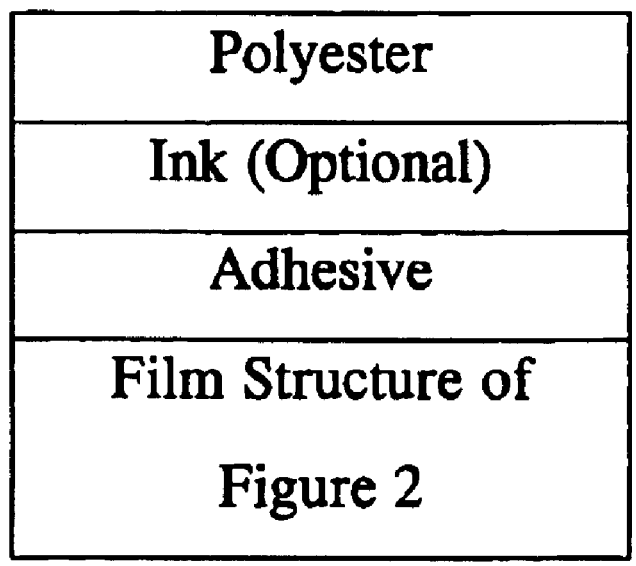
FIG. 3 is a film structure of the present invention having the film structure of FIG. 2, an adhesive layer, an ink layer and a polyester layer.

In a particularly preferred embodiment of the present invention, which is represented by FIG. 3, the multilayer film structure is laminated to a plain or printed film structure comprising an adhesive layer wherein the adhesive material is exemplified by urethane; an ink layer; and a polyester layer.

The multilayer film structures of the invention may be laminated to another film structure or a packaging film component by any suitable means including adhesive lamination, thermal lamination, and extrusion lamination, with adhesive lamination being preferred. The coextruded film may be produced by any suitable coextrusion method, including blown and cast extrusion. A preferred method for preparing the multilayer film is cast extrusion.

The multilayer film structures of the present invention provide a package having a quick-setting seal at relatively low temperatures. This quick-setting seal property allows for high speeds on vertical or horizontal form/fill/seal packaging machines. The multilayer film structures also provide packages that will tear open easily. The multilayer film structures of the present invention further provide a package having adequate moisture and oxygen barrier, seal integrity, tear easibility, and flex crack resistance. The packages of the present invention also afford the product contained therein an optimal shelf life.

In the following examples the production of a film structure of the present invention is described.

EXAMPLE 1

A multilayer film, shown in Table I, was made having a sealant layer which is a blend of a plastomer (Dow Affinity™ PT1409 plastomer) at 30% LLDPE (ExxonMobile LD-135.09 LDPE) at 65%, and a slip concentrate (Ampacet Corp. 10090 slip concentrate) at 5%; an outside layer which is a blend of white concentrate (Ampacet Corp. KM82199 colorant) at 20% and an HDPE resin (Equistar Alathon® M-6060 HDPE) at 80%; and a middle layer which is a blend of white concentrate (Ampacet Corp. KM82199 colorant) at 25% and an HDPE resin (Equistar Alathon® M-6060 HDPE) at 75%. Optionally, the middle layer may contain a regrind of the overall multilayer film described above at about 0% to about 40%, replacing the HDPE component.

Each blend was plasticated and melt extruded through three separate extruders into a three-layer die and cooled on a matte chill roll on conventional cast film equipment. The resulting film was then laminated to plain or printed oriented films using common laminating techniques such as adhesive or extrusion lamination. The following chart represents the product of this Example.

TABLE I

MULTILAYER FILM

| | Resin | Film Density (g/cc) | % of Layer | % of Web | Layer Caliper (mil) |
|---|---|---|---|---|---|
| Layer 1 | Equistar M-6060 HDPE | 0.960 | 80.0% | 10.0% | 0.15 |
| | Ampacet KM82199 | 1.530 | 20.0% | | |
| Layer 2 | Equistar M-6060 HDPE (+ Regrind) | 0.960 | 75.0% | 60.0% | 0.90 |
| | Ampacet KM82199 | 1.530 | 25.0% | | |
| Layer 3 | Exxon LD-135.09 | 0.921 | 65.0% | 30.0% | 0.45 |
| | Dow PT1409 | 0.911 | 30.0% | | |
| | Ampacet 10090 | 0.920 | 5.0% | | |
| TOTAL | | | | | 1.50 |

EXAMPLE 2

The multilayer film structure of Example 1 was laminated to a 48 gauge PET using a urethane adhesive. When compared to existing structures in the field of packaging for flowable materials such as a 48 gauge PET adhesive-laminated to a monolayer MDPE sealant film or a 48 gauge PET adhesive-laminated to a monolayer LLDPE sealant film, the multilayer film structure of the invention sealed at temperatures equivalent to or lower than the LLDPE film, while having at least the same or better than the tear properties of the MDPE film.

We claim:
1. A multilayer film structure comprising:
a first layer comprising a blend of a first poly(ethylene) having a density of about 0.960 g/cc wherein the first poly(ethylene) comprises about 80% of the film layer, and a colorant;
a second layer comprising a blend of a second poly (ethylene) having a density of about 0.960 g/cc wherein the second poly(ethylene) comprises about 75% of the second film layer, and a colorant; and a third layer comprising a blend of a third poly(ethylene) having a density of about 0.921 g/cc wherein the third poly(ethylene) comprises about 65% of the third film layer, and a fourth poly(ethylene) having a density of about 0.911 g/cc wherein the fourth poly(ethylene) comprises about 30% of the third film layer;

wherein the first layer has a thickness of about 0.15 mils, the second layer has a thickness of about 0.90 mils, and the third layer has a thickness of about 0.45 mils and further wherein the film structure has a total thickness of about 1.5 mils; and wherein said first layer is laminated to a film wherein said film comprises oriented PET.

2. A multilayer film structure having at least two layers comprising:
  (a) A first layer comprising poly(ethylene) or blended poly(ethylene) wherein said first layer poly(ethylene) is selected from poly(ethylenes) having a density from about 0.93 g/cc to 0.97 g/cc; and
  (b) A second layer comprising a blend of a polyethylene having a density of 0.921 g/cc and a polyethylene plastomer having a density of 0.911 wherein said second layer is capable of forming a heat seal, wherein said first layer is laminated to a film wherein said film comprises a polymeric material selected from the group consisting of oriented PET, oriented polypropylene, oriented polyethylene, oriented nylon, and coated or uncoated cellophane.

3. The multilayer film of claim 2 wherein said first layer comprises two layers, each layer comprising at least one identical poly(ethylene) or blended poly(ethylene).

4. The multilayer film of claim 2 wherein said first layer further comprises a colorant.

5. The multilayer film of claim 2 wherein said first layer further comprises a filler.

6. The multilayer film of claim 2 wherein said first layer further comprises a regrind of the entire multilayer film structure.

7. The multilayer film of claim 3 wherein one or both of said two layers comprises a colorant.

8. The multilayer film of claim 3 wherein one or both of said two layers comprises a filler.

9. The multilayer film of claim 3 wherein one or both of said two layers comprises a regrind of the entire multilayer film structure.

10. The multilayer film of claim 2 wherein said first layer poly(ethylene) is selected from poly(ethylenes) having a density from about 0.94 g/cc to about 0.965 g/cc.

11. The multilayer film of claim 2 wherein said first layer poly(ethylene) comprises HDPE.

12. The multilayer film of claim 11 wherein said HDPE has a density of about 0.96 g/cc.

13. The multilayer film of claim 2 wherein the oriented PET is coated with a barrier resin.

14. The multilayer film of claim 2 wherein the oriented polypropylene is coated with a barrier resin.

15. The multilayer film of claim 2 wherein the oriented nylon is coated with a barrier resin.

16. A package made from the multilayer film of claim 2.

17. A package made from the multilayer film of claim 3.

18. The multilayer film of claim 2 further comprising:
  a third layer comprising poly(ethylene) or blended poly(ethylene) wherein the third layer polyethylene is selected from a poly(ethylene) having a density range from about 0.93 g/cc to about 0.97 g/cc.

19. The multilayer film of claim 18 wherein the third layer is disposed between and in contact with the first layer and the second layer.

20. The multilayer film of claim 18, wherein the first layer has a thickness that is no greater than about 70% of the total thickness of the film and further wherein the third layer has a thickness that is no more than about 20% of the total thickness of the film.

21. The multilayer film of claim 2 wherein the film is formed by cast extrusion.

* * * * *